A. F. DAUM.

CARTRIDGE FUSE.

APPLICATION FILED OCT. 30, 1915.

Reissued Jan. 2, 1917. 14,239.

WITNESSES

J. Hekel Bradley

A. M. Seitz

INVENTOR

Albert F. Daum by Horace G. Seitz his Attorney.

UNITED STATES PATENT OFFICE.

ALBERT F. DAUM, OF PITTSBURGH, PENNSYLVANIA.

CARTRIDGE-FUSE.

14,239. Specification of Reissued Letters Patent. Reissued Jan. 2, 1917.

Original No. 1,061,228, dated May 6, 1913, Serial No. 680,939, filed March 1, 1912. Application for reissue filed October 30, 1915. Serial No. 58,916.

*To all whom it may concern:*

Be it known that I, ALBERT F. DAUM, a citizen of the United States, residing at Pittsburgh, in the county of Allegheny and State of Pennsylvania, have invented new and useful Improvements in Cartridge-Fuses, of which the following is a specification.

My invention relates to cartridge fuses and its object is to provide cartridge fuses in which the fuse wire, strip or ribbon may be positively and reliably clamped to the terminal caps so that any subsequent shrinkage of the body or shell will not cause the fuse wire, strip or ribbon to become loose in the clamping members.

In many cartridge fuses the shrinking of the body allows the member which clamps the fuse wire, strip, or ribbon to the cap, to become loose, thereby interfering with the continuity of the electric circuit. With my improvement, the shell or body is not directly or indirectly a clamping member.

Another object of this invention is to provide means whereby flat or knife terminals on the caps may be brought readily into line and prevented from getting out of alinement.

Another object is to prevent the rotation of the clamping member which is within the cap whereby torsion on the fuse wire or ribbon is eliminated.

Figure 1:
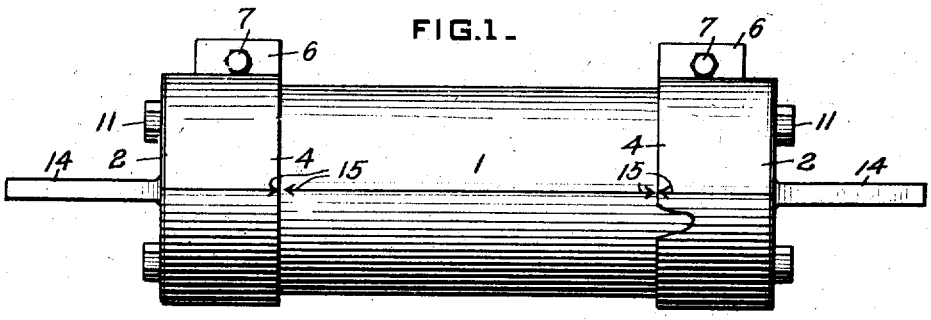
Figure 2:
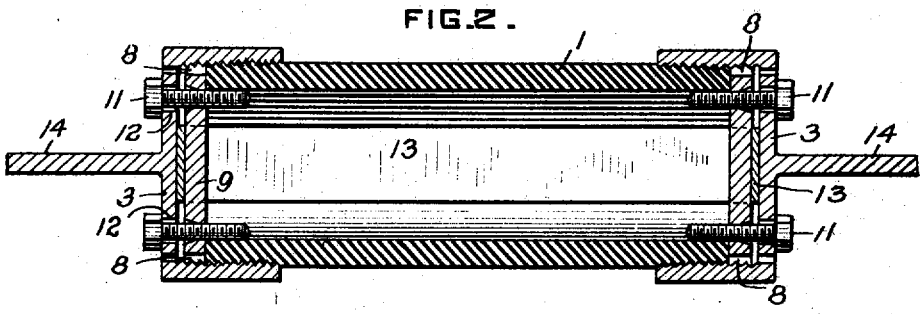
Figure 3:
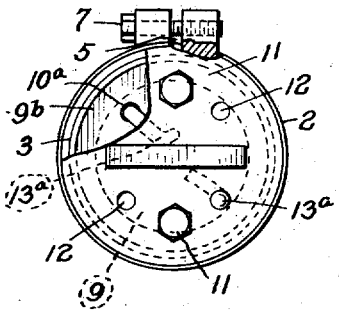
Figure 4:
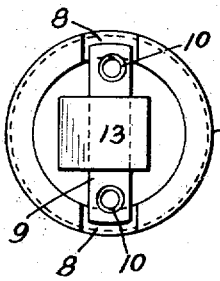
Figure 6:
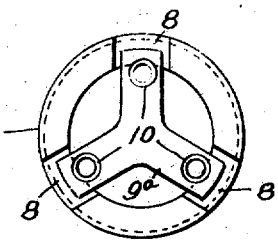
Figure 5:
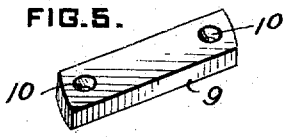
Figure 7:
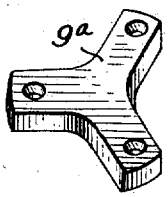

Referring to the accompanying sheet of drawings, Figure 1 is a side elevation of a cartridge fuse embodying one form of my invention; Fig. 2, a longitudinal section of a modified form of my invention; Fig. 3, an end view of Fig. 1, slightly modified and partly broken away; Fig. 4, an end view of Fig. 2 with the caps and screws omitted; Fig. 5 a perspective view of the clamping member shown in Fig. 4; Fig. 6, a view like Fig. 4 but with three-armed clamping member; and Fig. 7, a similar view of the clamping member shown on Fig. 6.

Referring first to Figs. 1 to 5 of the drawing, 1 is the tubular, preferably cylindrical, casing, body, or shell composed usually of vulcanite, but other non-conductors of electricity may be used. The ends of the shell are provided with the cup-shaped caps 2, each having its bottom, end, or closure 3 opposite an end of the shell and its skirt, flange, or cylindrical side 4, surrounding an end of the shell. In Fig. 1 I have shown the skirt or flange toward the end 3 of the cap, and with a pair of opposing lugs 6 on the flange at opposite sides of the slot 5. The lugs 6 are provided with the headed screw 7 which draws the sides of the slot toward each other and causes the slotted flange 4 to grip the shell. The screw 7 passes loosely through one lug and is threaded to correspond to the threads in the other lug, the head of the screw operating on the first lug to draw the lugs toward each other. However, the caps may be screwed upon the ends of the shell in the usual way as shown in Fig. 2, or they may loosely or telescopically fit thereon, the slot 5 and the lugs 6 being omitted. Each end of the shell has diametrically opposite open-ended slots or notches 8 to receive the clamping members or bars 9, preferably of conducting material, having a threaded hole 10 at each side of the center to receive the bolts or screws 11 having their intermediate portions in the holes 12 in the caps, the heads of the screws or bolts bearing on the outer faces of the ends 3 of the caps. 13 is a fuse ribbon having its ends bent over the bars 9 and clamped between the said bars and their respective caps by the screws or bolts 11. It is seen that in the absence of the fusible element the screws or bolts 11 will draw the bars 9 tightly against the inner faces of the ends of the caps without any co-action or dependence on the shell 1, there being no engagement of the ends of the bars with the skirt of the cap to prevent the free relative movement necessary to produce this result, so that, if the shell should shrink, there would be no tendency whatever to loosen the clamping action between each bar 9 and its respective cap, even though shrinking of the shell may tend to loosen the cap on the shell. It will also be seen that by placing the holes 10 spaced from the center of the bar, the portion of the latter is left free for the passage thereover of the fuse element, the clamping screws being in positions where interference with the positioning of the strip or wire is absent, and also in positions where there is practically no liability of the fuse element being forced into the threads of the screw.

Each cap is provided with the flat or knife terminal 14, preferably made integral with the end of the cap. In order to fit the usual pairs of spring clips or terminals, it is necessary that the knife terminals on the caps be arranged substantially in the same plane, or more correctly that the corresponding sides of the terminals should lie between parallel planes. In order to insure that, when the fuse ribbon 13 is clamped to both caps as described, the flat sides of the knife terminals shall lie substantially between parallel planes, and that the caps 2 may be interchangeable on the ends of the same shell, I have arranged the holes 12 for the screws or bolts 11 in each cap so that a line connecting them will be at right angles to the knife terminal 14 on the same cap and have arranged the notches 8 between parallel planes, or so that the longitudinal edges of the bars 9 are parallel or nearly so. The bars 9 may be differently shaped and the notches 8 differently arranged to secure the interchangeability of the caps and the alinement of the knife terminals. I intend to cover broadly any construction whereby these two results are secured, provided that such construction comes within the spirit of my invention and within the liberal interpretation of the appended claims. The placing of the knife terminals at the center of the cap prevents the use of a center screw. To further assist the arranging of the knife terminals in line, I place gage or guide marks 15 on the skirts of the caps and on the shell, so arranged that, when these marks are in alinement, the terminals lie in the same plane. These marks may be arranged variously, it being necessary only that the mark on each cap register with a mark on the shell, but it is preferred that all the marks be in one line. To facilitate the insertion of the screws or bolts 11 in the holes 10, I make the notches a little wider than the bars 9 so that the latter can move slightly, it being difficult to turn the caps always so as to bring the holes 10 and 12 into exact alinement when the bar 9 has no play in its seats.

In Fig. 6, I have provided the end of the shell with three notches 8 arranged 120° apart, and have made the clamping member $9^a$ have three arms 120° apart which lie in the said notches, just as the ends of the bar or member 9 lie in their respective notches. The three-armed or V-shaped member $9^a$ evidently cannot, by movement on its own plane, slide out of the notches, it not being necessary to hold it in place or to use care not to displace it while starting the caps on over the ends of the shell.

In Fig. 3, I use the washers $9^b$ instead of the straight bars 9 or the spiders $9^a$. These washers rest on the ends of the body and are shown without means to prevent their rotation, but I do not limit my invention to this feature. The washers have a circle of threaded holes $10^a$, in some of which the screws or bolts enter, and through others of which the fuses $13^a$ pass from the interior of the body, the ends of the fuses being bent so as to lie between the washers and the caps, the center of the washer being free from openings as in the bar form referred to. It is readily seen that the spaces at each side of the bar 9, or the arms of the spider $9^a$, are in some respects equivalent to the holes $10^a$.

I claim:—

1. In a cartridge fuse, a tubular body, skirted caps secured exteriorly of the ends of the body and provided with holes in their ends, a washer within each cap free therefrom and from the body and having therein threaded holes arranged to register with complemental holes in the adjacent cap, a fuse element extending through the said body and having its ends passed through one of the holes in each washer, and one or more screws extending through some only of the said holes in a cap and certain of the unoccupied holes in the washer to clamp the fuse element between each washer and the adjacent cap, other of said registering holes being unoccupied to allow the escape of gases therethrough.

2. In a cartridge fuse, a tubular body, a cup-shaped cap having its closed end opposite the end of the body and having its skirted portion arranged telescopically over one end of the body and provided with a slot, and means for drawing the opposing edges of the slot toward each other so as to clamp the skirted portion to the body.

3. In a refillable fuse, an end cap, a shell adapted to extend into said cap, a metallic member within the end cap and free from peripheral engagement with the skirt of the cap and coöperating with the cap to secure a fuse element therebetween, said cap and member having complemental openings spaced from the fuse axis to provide a free clamping space between the cap and member intermediate said openings, a plurality of clamping screws extending through cap openings and threaded into member openings, and means for removably securing the cap to the shell, said member being free from holding engagement with the shell, whereby maintenance of position of the cap by said means and the freedom from holding engagement between member and shell will permit the member to be drawn into clamping position by the threading action of the clamping screws.

Signed at Pittsburgh, Penna., this 27th day of October, 1915.

ALBERT F. DAUM.

Witnesses:
L. J. CLINTON,
L. H. McCABE.